United States Patent
Ahn

(12) 
(10) Patent No.: US 6,259,577 B1
(45) Date of Patent: Jul. 10, 2001

(54) METHOD AND APPARATUS FOR ORGANIZING SERVO DATA TO EXPAND DATA REGION AND COUNTING SECTOR NUMBERS FROM HEADERLESS SERVO FORMAT IN A DISK DRIVE

(75) Inventor: Young-Shun Ahn, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/879,857

(22) Filed: Jun. 20, 1997

(30) Foreign Application Priority Data

Jun. 20, 1996 (KR) .................................................. 96-22612

(51) Int. Cl.$^7$ .................................................. G11B 5/596
(52) U.S. Cl. ..................................... 360/78.14; 360/77.07
(58) Field of Search .............................. 360/48, 49, 51, 360/77.05, 77.08, 78.01, 78.04, 78.14, 77.07

(56) References Cited

U.S. PATENT DOCUMENTS

| | | | |
|---|---|---|---|
| 5,210,660 | 5/1993 | Hetzler | 360/51 |
| 5,255,136 | 10/1993 | Machado et al. | 360/77.02 |
| 5,475,540 | 12/1995 | Gold | 360/48 |
| 5,500,848 | 3/1996 | Best et al. | 360/48 |
| 5,523,903 | 6/1996 | Hetzler et al. | 360/77.08 |
| 5,561,566 | * 10/1996 | Kigami et al. | 360/53 |
| 5,581,418 | 12/1996 | Hasebe | 360/51 |
| 5,589,998 | 12/1996 | Yu | 360/78.14 |
| 5,596,460 | 1/1997 | Greenberg et al. | 360/78.14 |
| 5,615,190 | 3/1997 | Best et al. | 369/58 |
| 5,627,695 | 5/1997 | Prins et al. | 360/51 |
| 5,737,145 | * 4/1998 | Jung | 360/77.08 |
| 5,748,401 | * 5/1998 | Kawai | 360/77.08 |
| 5,812,335 | * 9/1998 | Kool et al. | 360/51 |
| 5,818,654 | * 10/1998 | Reddy et al. | 360/53 |
| 5,822,142 | * 10/1998 | Hicken | 360/53 |
| 5,852,523 | * 12/1998 | Jung | 360/49 |

FOREIGN PATENT DOCUMENTS 62-248172 * 10/1987 (JP) .

* cited by examiner

Primary Examiner—David L. Ometz
(74) Attorney, Agent, or Firm—Robert E. Bushnell, Esq.

(57) ABSTRACT

In the sector number counting method of the HDD using a disk as the recording medium having a plurality of servo sectors which are divided into several servo sectors groups, so that the first sector number information of each of the divided sectors groups is recorded on an index region, the inventive method for counting the sector number according to the present invention comprises the steps of checking whether the index bit recorded on the index region is detected every time when a servo interrupt occurs, and counting and saving the sector number according to a count value of an index timer on the basis of the first sector number of the servo sectors group corresponding to the index bit after the index timer is started when the index bit is detected.

21 Claims, 4 Drawing Sheets

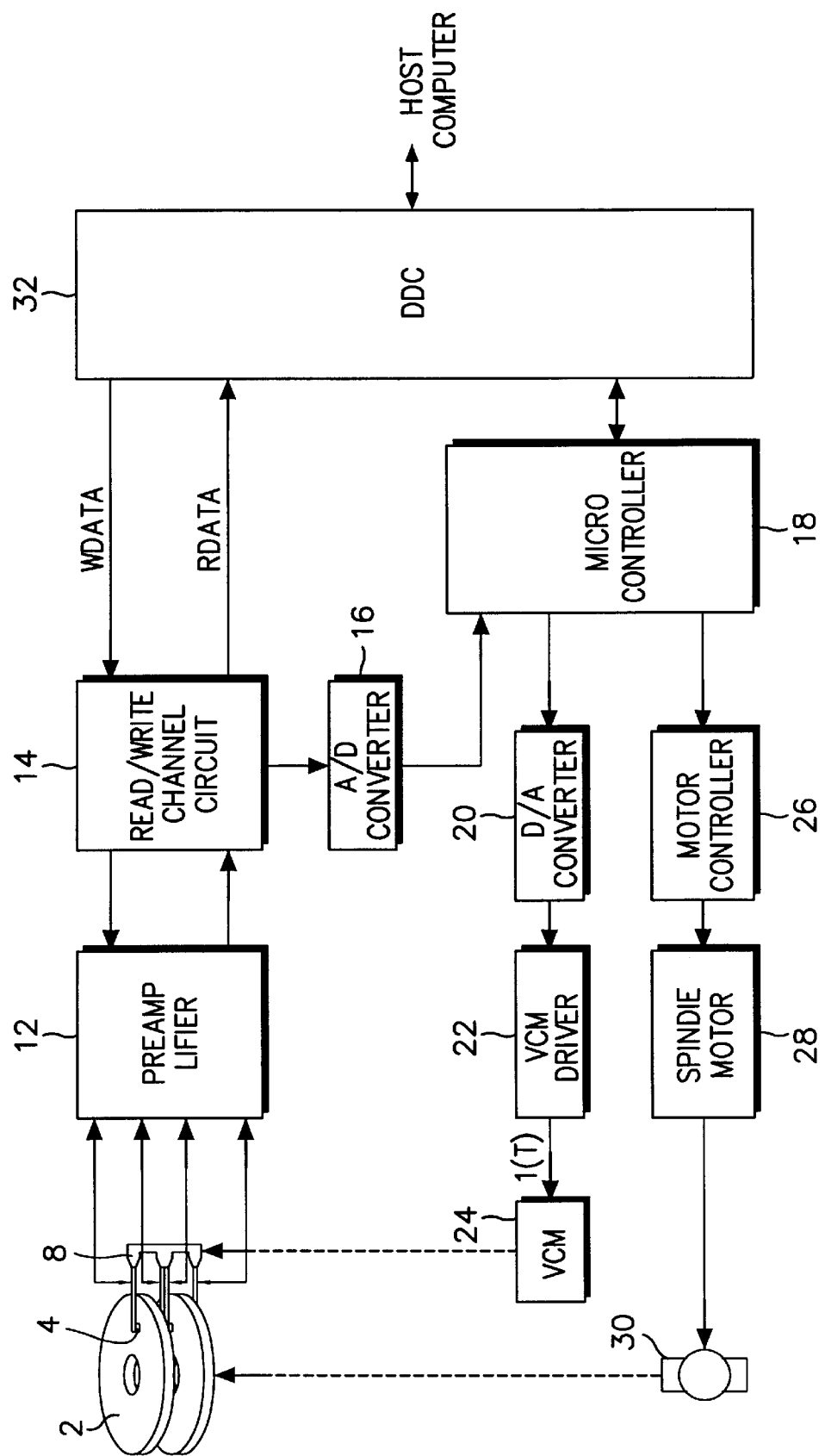

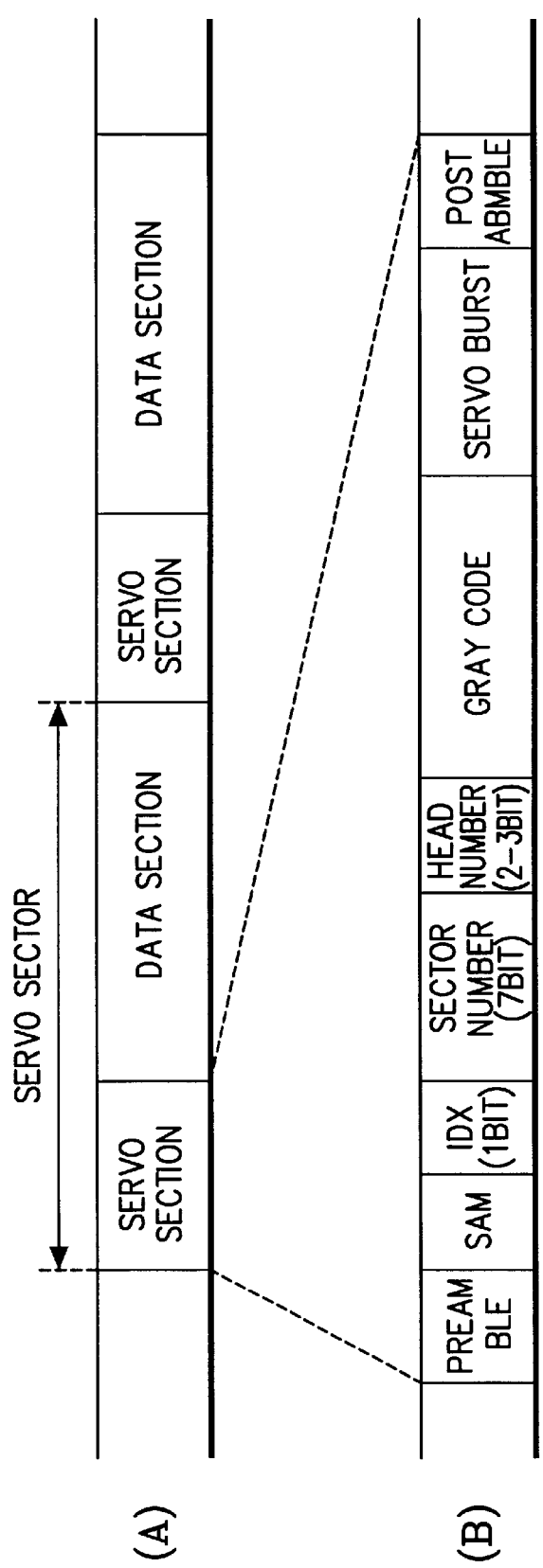
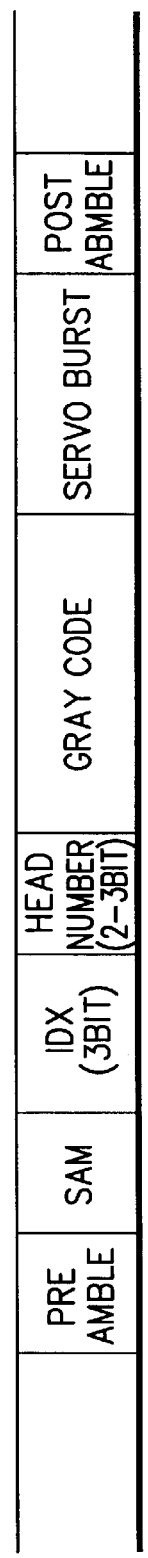

METHOD AND APPARATUS FOR ORGANIZING SERVO DATA TO EXPAND DATA REGION AND COUNTING SECTOR NUMBERS FROM HEADERLESS SERVO FORMAT IN A DISK DRIVE

CLAIM FOR PRIORITY

This application makes reference to, incorporates the same herein, and claims all benefits accruing under 35 U.S.C. §119 from an application for METHOD FOR ORGANIZING THE SERVO DATA TO EXPAND THE DATA REGION AND FOR COUNTING THE SECTOR NUMBERS earlier filed in the Korean Industrial Property Office on Jun. 20, 1996, and there duly assigned Ser. No. 22612/1996.

BACKGROUND OF THE INVENTION

1. Technical Field

The present invention relates to a hard disk drive using a headerless servo format, and more particularly, relates to a method for organizing servo data and counting sector numbers from the headerless servo format without the need for a sector number region.

2. Related Art

Hard disk drives (HDD) typically include one or more magnetic disks defining a multiplicity of concentric data tracks. Each data track is divided into sectors with intersector gaps therebetween, and each sector is subdivided into a data section and a servo section. The data sections are used for the storage of main data or user information. The servo sectors are used for the storage of control data such as automatic gain control data, track addresses and tracking servo patterns for use in positioning a head. Magnetic disk drives having high data density generally rely upon servo control systems for moving a selected transducer (head) from a departure track to a destination track location when data information is written or read from the disk. Exemplary disk drive architectures having head position control systems using servo information are disclosed in U.S. Pat. No. 5,210,660 for Sectored Servo Independent Of Data Architecture issued to Hetzler, and U.S. Pat. No. 5,255,136 for High Capacity Submicro-Winchester Fixed Disk Drive issued to Machado et al., U.S. Pat. No. 5,475,540 for Magnetic Data Storage Disk Drive With Data Block Sequencing By Using ID Fields After Embedded Servo Sectors issued to Gold., and U.S. Pat. No. 5,596,460 for System And Method For Encoding A Servo Address issued to Greenberg et al.

A typical sector of an arbitray track of the magnetic disk is composed of a servo section in which servo information is recorded and a data section succeeding the servo section in which data identification (ID) is recorded. A conventional data section includes a plurality of identification (ID) regions, data regions and PAD regions serving as intersector gaps therebetween. Commonly, the ID region includes an ID sync, an ID address mark (AM), a head and cylinder number, a sector number, a split and flag, and a cyclic redundancy check code (CRC). The data region includes a data sync, a data address mark (AM), data and an error correction code (ECC). Generally, in order to read information of the ID region and the data region of the respective data section, the HDD must be synchronized with a clock frequency previously written on the magnetic disk by using the ID sync and data sync. In practice however, the ID sync requires many bytes that are restrictive for high density HDD application.

Recent efforts to formulate a headerless sector format suitable for high density HDDs are disclosed, for example, in U.S. Pat. No. 5,500,848 for Sector Servo Data Recording Disk Having Data Regions Without Identification (ID) Fields issued to Best et al, U.S. Pat. No. 5,523,903 for Sector Architecture For Fixed Block Disk Drive issued to Hetzler et al., U.S. Pat. No. 5,581,418 for Magnetic Disk Drive Unit Capable Of Determining Data Region Position Of Data Region That Does Not Include Position Identification Data issued to Hasebe, and U.S. Pat. No. 5,627,695 for System And Method For Generating Unique Sector Identifiers For An Identificationless Disk Format issued to Prins. Best et al. '848, for example, disclose a fixed block architecture sector format that includes information encoded in the servo region of a sector to enable a data recording head to locate and identify a data sector for read and write operations without the need of an ID region. Similarly, Hetzer et al. '903 and Hasebe '418 each discloses a sector architecture that further includes information contained in electronic storage to enable the data recording head to locate and identify data sectors for read and write operations without using data ID fields. Likewise, Prins '695 also discloses a disk drive system for determining a sector ID of a data sector on a disk without using data ID fields in order to maximize disk capacity.

Generally, the servo section of the HDD using a headerless servo format includes a preamble region for synchronizing with a system clock, a servo address mark (SAM) region for recording a reference pattern for producing various servo timing signals, an index (IDX) region for supplying single rotation information of the disks, a sector number region for recording a servo sector number, a head number region for recording the head number, a gray code region for recording trade information, a servo burst region for the on-track control of the heads and a postamble region.

Typically, index information consists of one bit, the sector number region consists of 7 bits, and the head number region consists of 2–3 bits all of which are varied depending on the capacity of the HDD. The purpose of using a headerless servo writing pattern is to remove data ID from the data section so as to increase the capacity of the data section. This headerless servo writing pattern, however, results in the increase of the servo section length due to the augmentation of the servo data. Moreover, if the servo data is erroneously written on the servo section, the accuracy of the servo data cannot be guaranteed.

SUMMARY OF THE INVENTION

Accordingly, it is therefore an object of the present invention to provide a disk drive using a headerless sector format that is suitable for high density recording with increased storage capacity.

It is also an object to provide a disk drive and a servo data organizing method for expanding the capacity of a data section of a servo sector in a headerless sector format for high density recording disk drive.

It is further an object to provide a servo data organizing method for removing a sector number region from a servo section in a disk drive using a headerless servo format.

It is yet another object to provide a servo data organizing method for counting the sector number from a headerless servo format without the need of a sector number region contained in a servo section.

These and other objects of the present invention can be achieved by a method for organizing servo information to expand a data region in a disk drive utilizing a headerless servo format on a disk containing a plurality of servo sectors groups each servo sectors group including a plurality of servo sectors each consisting of alternating a servo section and a data section. The method includes: removing a sector number region of the servo section from the servo section recording the servo information; and recording bit data indicating a first sector of a first servo sectors group on an index region of the servo section for subsequently recording single rotation data of the disk.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 1 is a block diagram of a system configuration of a hard disk drive constructed according to the principles of the present invention;

FIGS. 2A and 2B illustrate an exemplary headerless servo format of a disk;

FIG. 4 illustrates a servo section writing pattern according to the principles of the present invention.

DETAILED DESCRIPTION OF THE PREFERRED EMBODIMENT

Figure 3:
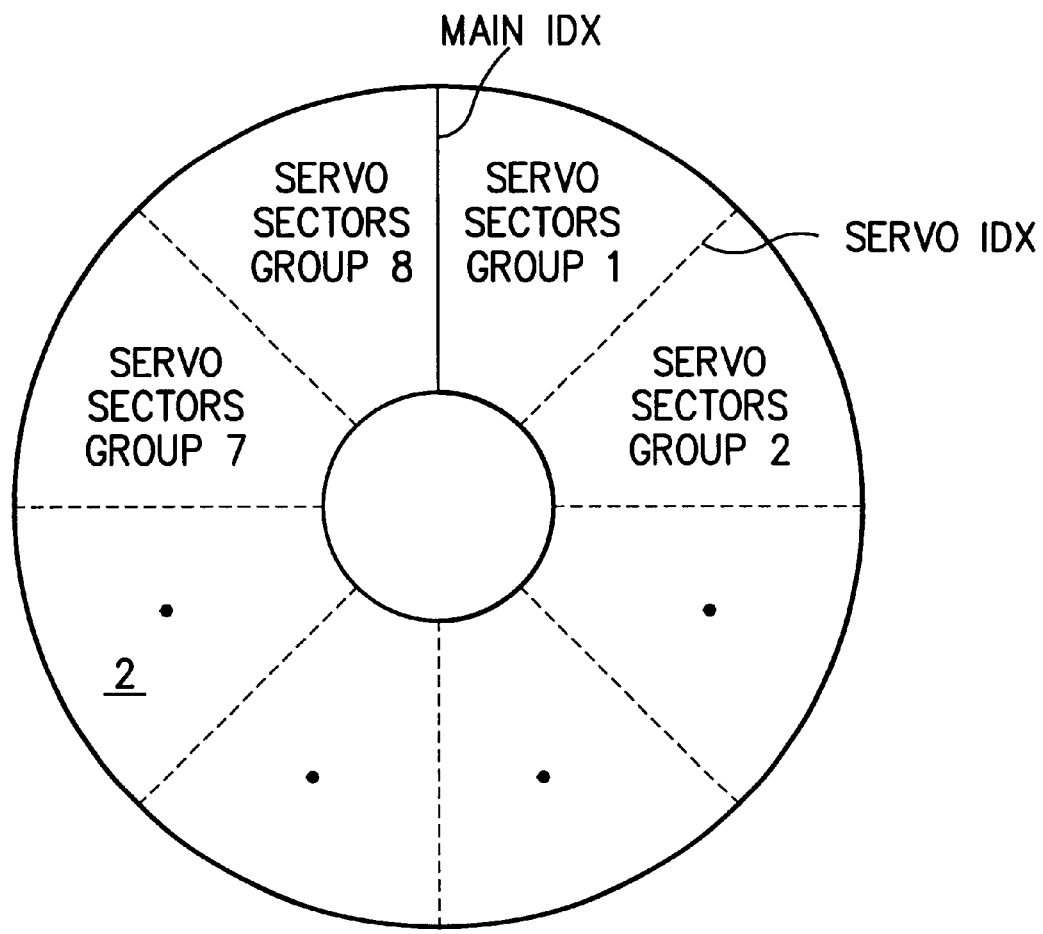
FIG. 3 illustrates a disk layout diagram according to the principles of the present invention.

Referring now to the drawings and particularly to FIG. 1, which illustrates a system configuration of a hard disk drive constructed according to the principles of the present invention. The hard disk drive includes, for example, two magnetic disks 2 and corresponding four transducer heads 4, a transducer head assembly 8 in an E-shape having actuator arms 6 each for supporting a respective pair of transducer heads 4, a preamplifier 12, a read/write channel circuit 14, an analog-to-digital converter (ADC) 16, a track information detector 17, a micro-controller 18, a digital-to-analog converter (DAC) 20, a voice coil motor (VCM) driver 22, a voice coil motor 24, a motor controller 26, a spindle motor driver 28, a spindle motor 30 for rotating the magnetic head 4 across the surface of the disk 2, and a disk data controller (DDC) 32.

Preamplifier 12 is electrically connected to the transducer head assembly 8 for amplifying a predetermined signal read out from the disk 2 using the transducer head 4 and transmitting the amplified signal to the read/write channel circuit 14. For the purpose of writing data onto the disk 2, the preamplifier 12 applies encoded writing data transmitted from the read/write channel circuit 14 to a designated transducer head from the four magnetic heads 4 to be recorded on the disk 2. At this time, the preamplifier 12 selects one of the magnetic heads 4 according to a control signal generated from a disk data controller (DDC) 32 under the instruction of a micro-controller 18.

Read/write channel circuit 14 is connected between the preamplifier 12 and the DDC 32 for decoding data pulses from an input signal received from the preamplifier 12 to generate read-out data RDATA, and for decoding writing data WDATA received from the DDC 32 to transmit the decodel WDATA to the preamplifier 12. The read/write channel circuit 14 generates a phase error signal (PES) by decoding head position information, i.e., a part of servo information, which is recorded on the disk. The PES is then transmitted to the micro-controller 18 via an analog-to-digital converter (ADC) 16. At this stage, the ADC 16 converts the PES into a digital value corresponding to a predetermined level and transmits the converted PES to the micro-controller 18.

Track information detector 17 is connected between the read/write channel circuit 14 and the micro-controller 18 for detecting from the RDATA, a track number for the current position of the transducer head 4 and providing the detected data to the micro-controller 18. The DDC 32 is controlled by the micro-controller 18 to record the data received from a host computer via the read/write channel circuit 14 and the preamplifier 12 or to transmit the data read out from the disk 2 to the host computer.

Micro-controller 18 controls the DDC 32 according to a command received from the host computer to search a track and position of the transducer head. In doing so, the micro-controller 18 uses the track number and the PES input from the track information detector 17 and the ADC 16, respectively. The digital-to-analog converter (DAC) 20 is connected to the micro-controller 18 for converting the digital signal output from the microcontroller 18 into an analog signal for controlling the position of the transducer heads 4. A VCM driver 22 generates a driving current for driving a VCM 24 according to the analog signal input from the DAC 20. The VCM 24 drives the transducer heads 4 to move in a radial direction of the disk 2 corresponding to the level of the driving current input from the VCM driver 22.

Motor controller 26 is connected to the micro-controller 18 for controlling a spindle motor driver 28 according to a disk rotation control command output from the micro-controller 18. The spindle motor driver 28 drives a spindle motor 30 in accordance with the control of the motor controller 26 to thereby rotate the disk 2.

FIGS. 2A and 2B illustrate an exemplary headerless servo format of a specific track on the disk in which servo sections and data sections are alternately arranged, and a pair of a successive servo section and a data section constitutes a servo sector. Since the headerless servo format does not contain data IDs in the data sections, an augmented servo check is utilized by recording the index, head, sector and cylinder data on the servo sections as shown in FIG. 2A. In other words, the servo section of the HDD using a headerless servo format includes a preamble region for synchronizing with a system clock, a servo address mark (SAM) region for recording a reference pattern for producing various servo timing signals, an index (IDX) region for supplying a single rotation information of the disks, a sector number region for recording the servo sector number, a head number region for recording the head number, a gray code region for recording the track information, a servo burst block for the on-track control of the heads and a postamble block.

As noted earlier, index information typically consists of one bit, the sector number region consists of 7 bits, and the head number region consists of 2–3 bits all of which are varied depending on the capacity of the HDD. The purpose of using a headerless servo writing pattern is to remove data ID from the data section so as to increase the capacity of the data section. This headerless servo) writing pattern, however, results in the increase of the servo section length due to the augmentation of the servo data Moreover, if the servo data is erroneously written on the servo section, the accuracy of the servo data cannot be guaranteed.

Turning now to FIG. 3, which illustrates a disk containing a plurality of servo sector groups according to the principles of the present invention. The disk 2 is divided largely into eight servo sectors groups. Assuming Hat the number of servo sectors in each track arranged concentrically on the disk 2 is seven two (72), each of the eight servo sectors groups has nine (9) servo sectors. For the sake of brevity, the servo sectors in each servo sectors group are simply referred to as "sectors." In order to distinguish between the servo sectors groups, main index data is recorded on a servo section of the first sector of a designated, first servo sectors group, and sub-index data is recorded on servo sections of the respective first sectors of each of the remaining servo sectors groups (from two to eight remaining servo sectors groups).

FIG. 4 illustrates a servo format having a servo writing pattern in which a sector number region is removed from a servo section. The inventive servo writing pattern according to the principles of the present invention contains an index region consisting of 3 bits which represent the division of eight servo sectors groups as shown in FIG. 3 and vary according to the numbers of the divided servo sectors groups. That is, when the value of the bit data varies from "000" to "001", the micro-controller 18 recognizes that the bit data is changed from the first servo sectors group to the second servo sectors group. In addition, while the index region is expanded by 2 bits, the servo section is reduced by 5 bits because the sector number region of 7 bits is eliminated.

Figure 5:
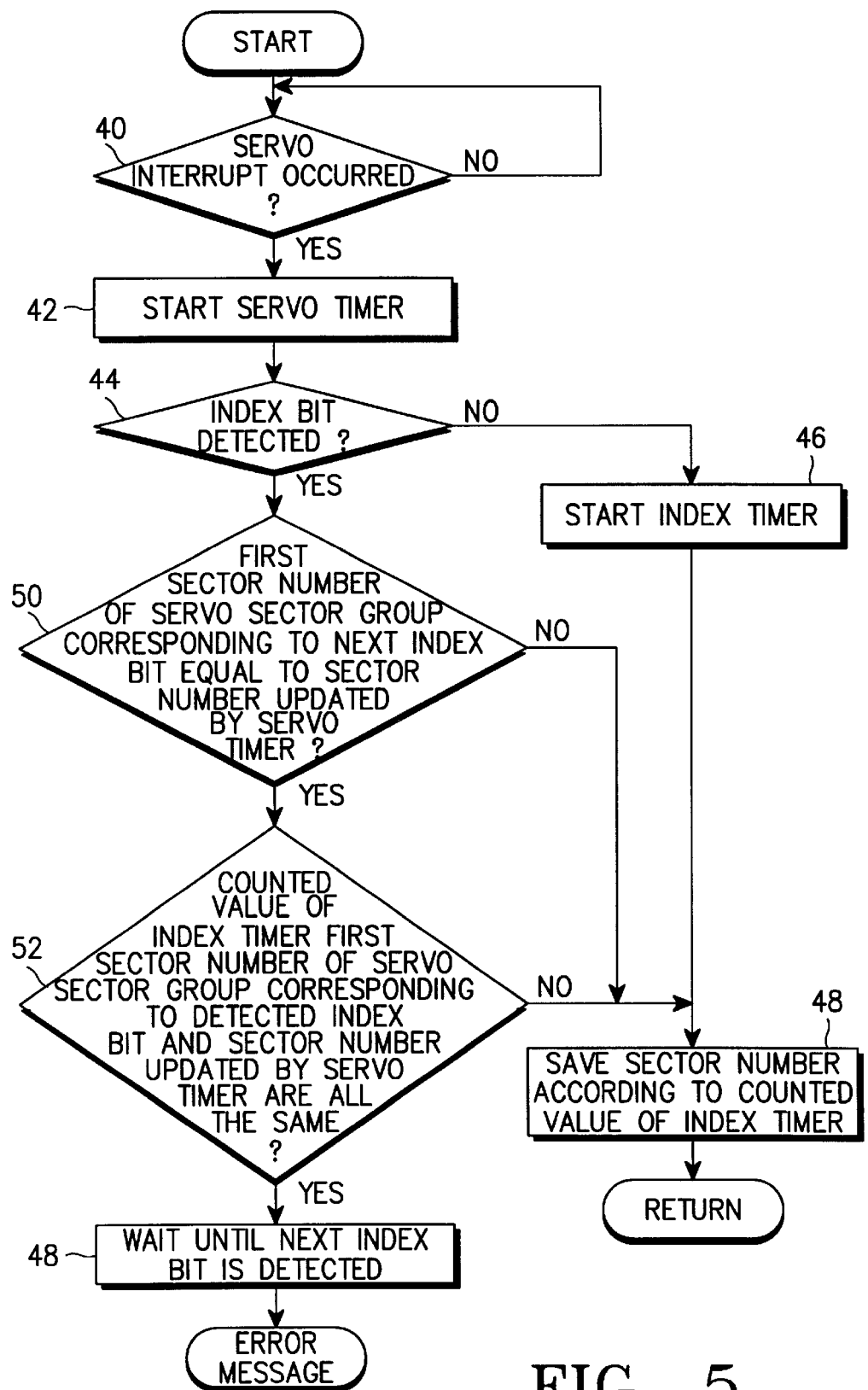
FIG. 5 is a control flow chart of a process of counting sector numbers of a hard disk drive using a headerless servo format according to the principles of the present invention.

A process for counting a sector number of the HDD using a servo writing pattern according to the principles of the present invention will now be described with reference to FIGS. 1 and 5.

First, when a servo interrupt occurs at step 40, the micro-controller 18 stat a servo timer at step 42 and proceeds to step 44. At this time, the sector number is updated by a counting operation of the servo tinier. At step 44, the micro-controller 18 determines whether an index bit contained in a servo section as shown in FIG. 4 is detected. When the index bit contained in the servo section is detected, the micro-controller 18 proceeds to step 46 to start operation of an index timer. After the index timer is started, the micro-controller 18 saves the sector number according to a counted value of the index timer on the basis of the sector number corresponding to the detected index bit data. That is, when the detected index bit is "000", the micro-controller 18 determines the sector number from the counted value of the index timer on the basis of the first sector (first sector of 72 sectors) of the first servo sectors group. Likewise, when the detected index bit is "001", the sector number is determined from the counted value of the index timer on the basis of the first sector (ninth sector of 72 sectors) of the second servo sectors group.

If the index bit is not detected due to external circumstances or errors of the servo data recorded at step 44, however, the micro-controller 18 proceeds to step 50 to determine whether the first sector number of the servo sectors group corresponding to the next index bit to be detected equals the sector number updated by the counting operation of the servo timer started from step 42. If the first sector number of the servo sectors group corresponding to the next index bit to be detected and the sector number updated by the counting operation of the servo timer are the same, the micro-controller 18 proceeds to step 48 to save the sector number according to the counted value of the index timer. Alternatively, if the first sector number of the servo sectors group corresponding to the next index bit to be detected and the sector number updated by the counting operation of the servo timer are not the same, the micro-controller 18 sets the read/write operation and proceeds to step 52 to determine whether the counted value of the index timer started by the index bit detected at step 50, the first sector number of the servo sectors group corresponding to the detected index bit, and the sector number updated by the servo timer started at step 42 are all the same. As the result, if the values of all three sector numbers are the same, the micro-controller 18 proceeds to step 48 to save the counted sector number for subsequent use. On the contrary, if the values of all three sector numbers are different, the micro-controller 18 sets a retry bit and then proceeds to step 54 to wait until the next index bit is detected. And if the detecting operation of the index bit is plagued with errors the micro-controller 18 generates error reports and terminates the sector number counting process.

As described above, the inventive method of the present invention can expand the data section by removing the sector number region from the servo section and prevent the errors due to the erroneous servo data recorded in the servo section, so that the reliability of the HDD can be improved.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for organizing servo information to expand a data region in a disk drive utilizing a headerless servo format comprising the steps of:

providing at least one disk having a plurality of servo sectors groups, each servo sectors group including a plurality of servo sectors each of said plurality of servo sectors comprising a servo section and a data section;

removing a sector number region of said servo section from said servo section recording said servo information; and recording bit data indicating a first sector of a servo sectors group on an index region of a servo section of a corresponding servo sectors group for subsequently recording single rotation data of said at least one disk.

2. The method of claim 1, wherein said bit data is recorded in binary data of more than two bits according to the number of the plurality of servo sectors groups.

3. The method of claim 2, further comprising the steps of:

starting a first timer for counting upon occurrence of a servo interrupt;

determining whether an index bit recorded on said index region is detected after said first timer is started;

starting a second timer for counting upon occurrence of when said index bit recorded on said index region is detected; and counting and saving a sector number according to a count value of said second timer on the basis of a first sector number of a servo sectors group of the plurality of servo sectors groups corresponding to said index bit detected from said index region.

4. The method of claim 1, further comprising the steps of:

starting a first timer for counting upon occurrence of a servo interrupt;

determining whether an index bit recorded on said index region is detected after said first timer is started;

starting a second timer for counting upon occurrence of when said index bit recorded on said index region is detected; and counting and saving a sector number according to a count value of said second timer on the basis of a first sector number of a servo sectors group of the plurality of servo sectors groups corresponding to said index bit detected from said index region.

5. A method for determining sector numbers of a disk in a disk drive, comprising the steps of:

providing at least one disk having a plurality of servo sectors, said plurality of servo sectors being divided into a plurality of servo sectors groups to form divided servo sectors groups such that corresponding first sector number data of each of the divided servo sectors groups is respectively recorded on an index region of a servo sector at a beginning of each divided servo sectors group;

starting a first timer for counting upon occurrence of a servo interrupt;

determining whether an index bit recorded on said index region is detected after said first timer is started;

starting a second timer for counting upon occurrence of when said index bit recorded on said index region is detected; and counting and saving a sector number according to a count value of said second timer on the basis of a first sector number of a servo sectors group of the plurality of servo sectors groups corresponding to said index bit detected from said index region.

6. The method of claim 5, further comprising the steps of:

determining whether the first sector number of a servo sectors group of the plurality of servo sectors groups corresponding to a next index bit to be detected equals a sector number updated by said first timer, when said index bit recorded on said index region is not detected; and saving the sector number according to the count value of said second timer, when the first sector number of the servo sectors group of the plurality of servo sectors groups corresponding to the next index bit to be detected equals the sector number updated by said first timer.

7. The method of claim 6, further comprising the steps of:

determining whether the count value of said second timer, the first sector number of the servo sectors group of the plurality of servo sectors groups corresponding to the detected index bit, and the sector number updated by said first timer are all the same, when the first sector number of the servo sectors group of the plurality of servo sectors groups corresponding to the next index bit to be detected is not the same as the sector number updated by said first timer;

saving the sector number according to the count value of said second timer, when the count value of said second timer, the first sector number of the servo sectors group of the plurality of servo sectors groups corresponding to the detected index bit, and the sector number updated by said first timer are all the same; and waiting for detection of the next index bit recorded in a next index region, when the count value of said second timer, the first sector number of the servo sectors group of the plurality of servo sectors groups corresponding to the detected index bit, and the sector number updated by said first timer are not the same.

8. The method of claim 5, further comprising the steps of:

removing a sector number region of a servo section from said servo section of said plurality of servo sectors recording servo information; and recording bit data indicating a first sector of a servo sectors group of the plurality of servo sectors groups on an index region of a servo section of a corresponding servo sectors group for subsequently recording single rotation data of said at least one disk.

9. The method of claim 8, wherein said bit data is recorded in binary data of more than two bits according to the number of the plurality of servo sectors groups.

10. An apparatus for organizing servo information to expand a data region in a disk drive utilizing a headerless servo format, comprising:

at least one disk having a plurality of servo sectors, said plurality of servo sectors being divided into a plurality of servo sectors groups to form divided servo sectors groups such that corresponding first sector number data of each of the divided servo sectors groups is respectively recorded on an index region of a servo sector at a beginning of each divided servo sectors group; and means for recording bit data indicating a first sector of a servo sectors group of the plurality of servo sectors groups on an index region of a servo section of a servo sector of a corresponding servo sectors group for subsequently recording single rotation data of said at least one disk.

11. The apparatus of claim 10, wherein said bit data is recorded in binary data of more than two bits according to the number of the plurality of servo sectors groups.

12. The apparatus of claim 11, further comprising:

a first timer for counting upon occurrence of a servo interrupt;

means for determining whether an index bit recorded on said index region is detected after said first timer is started;

a second timer for counting upon occurrence of when said index bit recorded on said index region is detected; and means for counting and saving a sector number according to a count value of said second timer on the basis of a first sector number of a servo sectors group of the plurality of servo sectors groups corresponding to said index bit detected from said index region.

13. The apparatus of claim 10, further comprising:

a first timer for counting upon occurrence of a servo interrupt;

means for determining whether an index bit recorded on said index region is detected after said first timer is started;

a second timer for counting upon occurrence of when said index bit recorded on said index region is detected; and means for counting and saving a sector number according to a count value of said second timer on the basis of a first sector number of a servo sectors group of the plurality of servo sectors groups corresponding to said index bit detected from said index region.

14. An apparatus for determining sector numbers of a disk in a disk drive, comprising:

at least one disk having a plurality of servo sectors, said plurality of servo sectors being divided into a plurality of servo sectors groups to form divided servo sectors groups such that corresponding first sector number data of each of the divided servo sectors groups is respectively recorded on an index region of a servo sector at a beginning of each divided servo sectors group;

a first timer for counting upon occurrence of a servo interrupt;

means for determining whether an index bit recorded on said index region is detected after said first timer is started;

a second timer for counting upon occurrence of when said index bit recorded on said index region is detected; and means for counting and saving a sector number according to a count value of said second timer on the basis of a first sector number of a servo sectors group of the plurality of servo sectors groups corresponding to said index bit detected from said index region.

15. The apparatus of claim 14, further comprising:

means for determining whether the first sector number of a servo sectors group of the plurality of servo sectors groups corresponding to a next index bit to be detected equals a sector number updated by said first timer, when said index bit recorded on said index region is not detected; and means for saving the sector number according to the count value of said second timer, when the first sector number of the servo sectors group of the plurality of servo sectors groups corresponding to the next index bit to be detected equals the sector number updated by said first timer.

16. The apparatus of claim 15, further comprising:

means for determining whether the count value of said second timer, the first sector number of the servo sectors group of the plurality of servo sectors groups corresponding to the detected index bit, and the sector number updated by said first timer are all the same, when the first sector number of the servo sectors group of the plurality of servo sectors groups corresponding to the next index bit to be detected is not the same as the sector number updated by said first timer;

means for saving the sector number according to the count value of said second timer, when the count value of said second timer, the first sector number of the servo sectors group of the plurality of servo sectors groups corresponding to the detected index bit, and the sector number updated by said first timer are all the same; and means for detecting the next index bit recorded in a next index region, when the count value of said second timer, the first sector number of the servo sectors group of the plurality of servo sectors groups corresponding to the detected index bit, and the sector number updated by said first timer are not the same.

17. The apparatus of claim 14, further comprising:

means for recording bit data indicating a first sector of a servo sectors group of the plurality of servo sectors groups on an index region of a servo section of a servo sector of a corresponding servo sectors group for subsequently recording single rotation data of said at least one disk.

18. A disk for a disk drive, comprising:

a plurality of servo sectors, said plurality of servo sectors having a headerless servo format, each of said plurality of servo sectors comprising a servo section and a data section, said plurality of servo sectors being divided into a plurality of servo sectors groups; and an index region for each servo sectors group, said index region being located within a servo section of a servo sector of a corresponding servo sectors group, said index region for recording bit data indicating a first sector of a servo sectors group of said plurality of servo sectors groups.

19. The disk of claim 18, wherein said bit data is recorded in binary data of more than two bits according to the number of the plurality of servo sectors groups.

20. The disk of claim 19, further comprised of said plurality of servo sectors being divided into said plurality of servo sectors groups to form divided servo sectors groups such that corresponding first sector number data of each of the divided servo sectors groups is respectively recorded on said index region of a servo sector at a beginning of each divided servo sectors group.

21. The disk of claim 18, further comprised of said plurality of servo sectors being divided into said plurality of servo sectors groups to form divided servo sectors groups such that corresponding first sector number data of each of the divided servo sectors groups is respectively recorded on said index region of a servo sector at a beginning of each divided servo sectors group.

* * * * *